United States Patent
Rahimi et al.

(10) Patent No.: US 11,073,902 B1
(45) Date of Patent: Jul. 27, 2021

(54) USING SKELETAL POSITION TO PREDICT VIRTUAL BOUNDARY ACTIVATION

(71) Applicant: Facebook Technologies, LLC, Menlo Park, CA (US)

(72) Inventors: Mahdi Salmani Rahimi, San Francisco, CA (US); Benjamin Antoine Georges Lefaudeux, Menlo Park, CA (US); Robert Foster, Half Moon Bay, CA (US); Weiguang Si, Fremont, CA (US); Samuel Alan Johnson, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/747,090

(22) Filed: Jan. 20, 2020

Related U.S. Application Data

(60) Provisional application No. 62/955,188, filed on Dec. 30, 2019.

(51) Int. Cl.
*G06F 3/01* (2006.01)
*G06F 3/0346* (2013.01)

(52) U.S. Cl.
CPC ............ *G06F 3/012* (2013.01); *G06F 3/0346* (2013.01)

(58) Field of Classification Search
USPC ......................................................... 345/156
See application file for complete search history.

(56) References Cited

U.S. PATENT DOCUMENTS

| | | | |
|---|---|---|---|
| 10,535,199 B1* | 1/2020 | Bond | G06T 15/08 |
| 10,859,831 B1* | 12/2020 | Pollard | G06T 7/70 |
| 2012/0154132 A1* | 6/2012 | Lee | G06F 3/038 |
| | | | 340/407.1 |
| 2018/0113506 A1* | 4/2018 | Hall | G02B 27/017 |
| 2018/0275764 A1* | 9/2018 | Lee | G06K 9/00355 |
| 2018/0356894 A1* | 12/2018 | Aalbu | G06F 3/012 |
| 2019/0043259 A1* | 2/2019 | Wang | G06F 3/012 |
| 2020/0004401 A1* | 1/2020 | Hwang | G06K 9/00355 |
| 2020/0134895 A1* | 4/2020 | Pollard | G06F 3/016 |
| 2020/0249748 A1* | 8/2020 | Ranganathan | G06F 3/012 |
| 2020/0371584 A1* | 11/2020 | Zhao | G06F 1/163 |

(Continued)

OTHER PUBLICATIONS

Kidwell, "Customizing your Oculus Rift Guardian," retrieved from https://www.windowscentral.com/how-customize-your-guardian-within-oculus-rift, Jan. 15, 2018, 3 pp.

(Continued)

*Primary Examiner* — Chineyere D Wills-Burns
(74) *Attorney, Agent, or Firm* — Shumaker & Sieffert, P.A

(57) ABSTRACT

An artificial reality system includes a head mounted display (HMD) and a hand-held device. A virtual boundary can provide for user safety during an artificial reality session. For example, the virtual boundary may be defined to protect the user from collisions with physical objects, such as walls, furniture, or the like, while the user is immersed in the artificial reality session. The artificial reality system can constrain the predicted motion path of a portion of a user's body based on body configuration parameters and range of motion of the joints associated with the body portion. The artificial reality system can then use the constrained motion paths to determine whether or not the virtual boundary warning should be activated.

20 Claims, 14 Drawing Sheets

(56) References Cited

U.S. PATENT DOCUMENTS

2020/0372702 A1* 11/2020 Yan ...................... G06F 3/0346

OTHER PUBLICATIONS

"Set Up the Oculus Rift Guardian System," retrieved from https://docs.unrealengine.com/en-US/Platforms/Oculus/HowTo/GuardianSystem, last modified Apr. 5, 2020, accessed Oct. 18, 2019, 5 pp.

"OVRBoundary Guardian System API," retrieved from https://developer.oculus.com/documentation/unity/latest/concepts/unity-ovrboundary/, last modified Apr. 16, 2020, accessed Oct. 18, 2019, 2 pp.

* cited by examiner

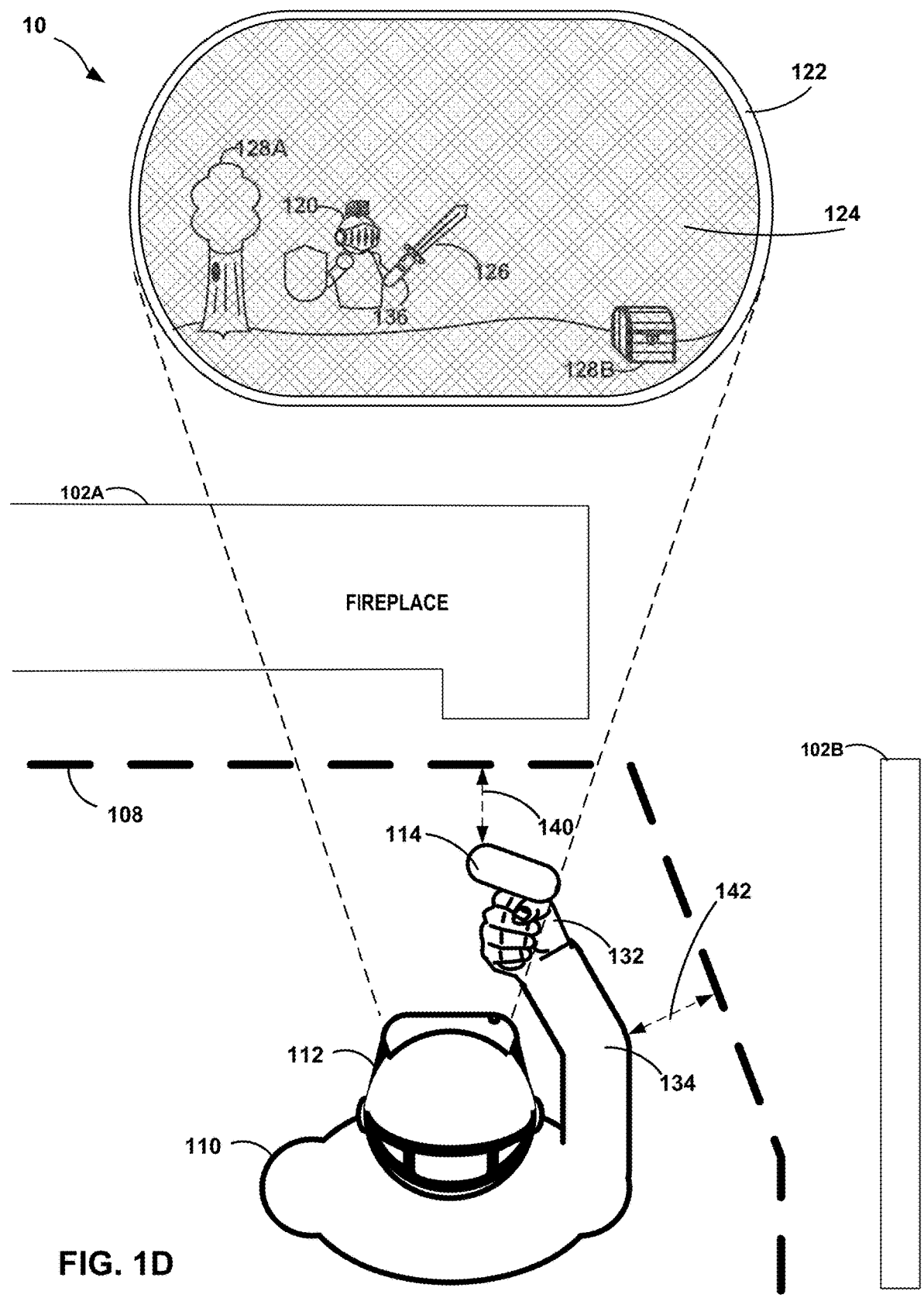

USING SKELETAL POSITION TO PREDICT VIRTUAL BOUNDARY ACTIVATION

This application claims the benefit of U.S. Provisional Patent Application No. 62/955,188, filed on Dec. 30, 2019, the entire contents of which is incorporated by reference herein.

TECHNICAL FIELD

This disclosure generally relates to artificial reality systems, such as virtual reality, mixed reality, and/or augmented reality systems, and more particularly, to utilizing a user's skeletal position to predict whether or not a virtual boundary should be activated.

BACKGROUND

Artificial reality systems are becoming increasingly ubiquitous with applications in many fields such as computer gaming, health and safety, industrial, training and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The artificial reality content may include completely-generated content or generated content combined with captured content (e.g., real-world video and/or images). During operation, the user may utilize a hand-held device, keyboard or other devices to interact with applications and the artificial reality system.

SUMMARY

In general, this disclosure describes artificial reality systems and, more specifically, improved virtual boundary activation for artificial reality systems. A virtual boundary can provide for user safety during an artificial reality session. For example, the virtual boundary may be defined to protect the user from collisions with physical objects, such as walls, furniture, or the like, while the user is immersed in the artificial reality session. When the user's HMD or hand-held controller approaches the virtual boundary, the virtual boundary may, for example, activate a virtual wall that is displayed within the artificial reality session to warn the user that the user is close to the virtual boundary. However, some previous systems do not accurately account for limbs crossing the virtual boundary. In particular, these systems may predict a position of the limb (e.g., arm) based on a velocity and direction of a hand-held controller. For example, these systems may determine a linear velocity and direction of a hand-held controller and activate the virtual boundary if the position of the controller predicted according to the linear velocity and direction would cross the virtual boundary. However, this simplistic type of prediction can cause the virtual boundary to be activated too frequently (i.e., when it may not be necessary). Frequent virtual boundary activations can interrupt the artificial reality experience leading to user dissatisfaction. In other examples, this simplistic type of prediction can cause the virtual boundary to be activated too late because the prediction does not accurately account for various constraints, such as the length of the arm (i.e., the user's arm is long enough to reach the virtual boundary if extended) or the motion may actually define an arc (e.g., a chopping motion).

As further described herein, an artificial reality system can, for example, determine a predicted position of a limb based on the length of the limb and the range of motion of the joints associated with the limb. As an example, the artificial reality system can determine a pose of an HMD and a hand-held controller. Using the HMD and hand-held controller poses, the system can determine a position and orientation of the user's head and the user's wrist. Positions of the user's shoulders can be constrained by the respective HMD pose. Once the position and orientation of the wrist and the position of the shoulder are determined, the artificial reality system can predict a position of the user's elbow. The position and orientation of the wrist, elbow and shoulder can then be used along with the length of the limb and range of motion data for the wrist, elbow and shoulder to determine constraints on the possible future locations of the joints. The artificial reality system can then use the constrained future locations to determine whether or not the virtual boundary should be activated.

Accordingly, the techniques of the disclosure provide specific technical improvements to the computer-related field of rendering and displaying content by an artificial reality system. For example, a user may participate in an immersive artificial reality experience and avoid collisions with physical objects in the physical environment occupied by the user. The user can define a virtual boundary around the physical objects and can be provided a warning if portions of the user's body is predicted to cross the virtual boundary.

A further technical improvement is that the collision avoidance capability provided by the techniques described herein provide improved virtual boundary activation when compared to previous systems. For example, the artificial reality system can more accurately predict that a portion of a user's body may cross a virtual boundary by basing a predicted motion path of the body portions on motion constraints associated with the body portions. A practical application of the techniques described herein is that an artificial reality system can avoid false positives when activating the virtual boundary and can avoid collisions with objects as a result of failing to activate the virtual boundary.

In one or more example aspects, an artificial reality system includes a head mounted display (HMD) configured to output artificial reality content; a hand-held device configured to interact with the artificial reality content; a pose tracker configured to determine an HMD pose and a hand-held device pose; a path predictor configured to determine: a current body position for at least a portion of a body of a user based on the HMD pose and the hand-held device pose, and a predicted motion path based on the current body position, motion of the HMD and the hand-held device, and one or more motion constraints; and a virtual boundary engine configured to, maintain a virtual boundary associated with a physical environment, and provide content for display by the HMD in response to a determination, that the predicted motion path comes within a threshold distance of the virtual boundary.

In one or more further example aspects, a method includes maintaining, by an artificial reality system, a virtual boundary associated with a physical environment, the artificial reality system including a head mounted display (HMD)

configured to output artificial reality content; determining an HMD pose representing a position and orientation of the HMD; determining a hand-held device pose representing a position and orientation of a hand-held device configured to interact with the artificial reality content; determining a current body position for at least a portion of a body of a user based on the HMD pose and the hand-held device pose; determining a predicted motion path based on the current body position, motion of the HMD and the hand-held device, and one or more motion constraints; and providing content for display by the HMD in response to determining that the predicted motion path comes within a threshold distance of the virtual boundary.

In one or more additional example aspects, a non-transitory, computer-readable medium includes instructions that, when executed, cause one or more processors of an artificial reality system including a head mounted display (HMD) to: maintain a virtual boundary associated with a physical environment; determine an HMD pose representing a position and orientation of the HMD; determine a hand-held device pose representing a position and orientation of a hand-held device configured to interact with the artificial reality content; determine a current body position for at least a portion of a body of a user based on the HMD pose and the hand-held device pose; determine a predicted motion path based on the current body position, motion of the HMD and the hand-held device, and one or more motion constraints; and provide content for display by the HMD in response to determining that the predicted motion path comes within a threshold distance of the virtual boundary.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 1D is an illustration depicting another example artificial reality system prior to virtual boundary activation, in accordance with the techniques of the disclosure.

Like reference characters refer to like elements throughout the figures and description.

DETAILED DESCRIPTION

FIGS. 1A-1E illustrate an example physical environment for an artificial reality system and various aspects of activation, by the artificial reality system, a virtual boundary warning with respect to the physical environment.

Figure 1A:
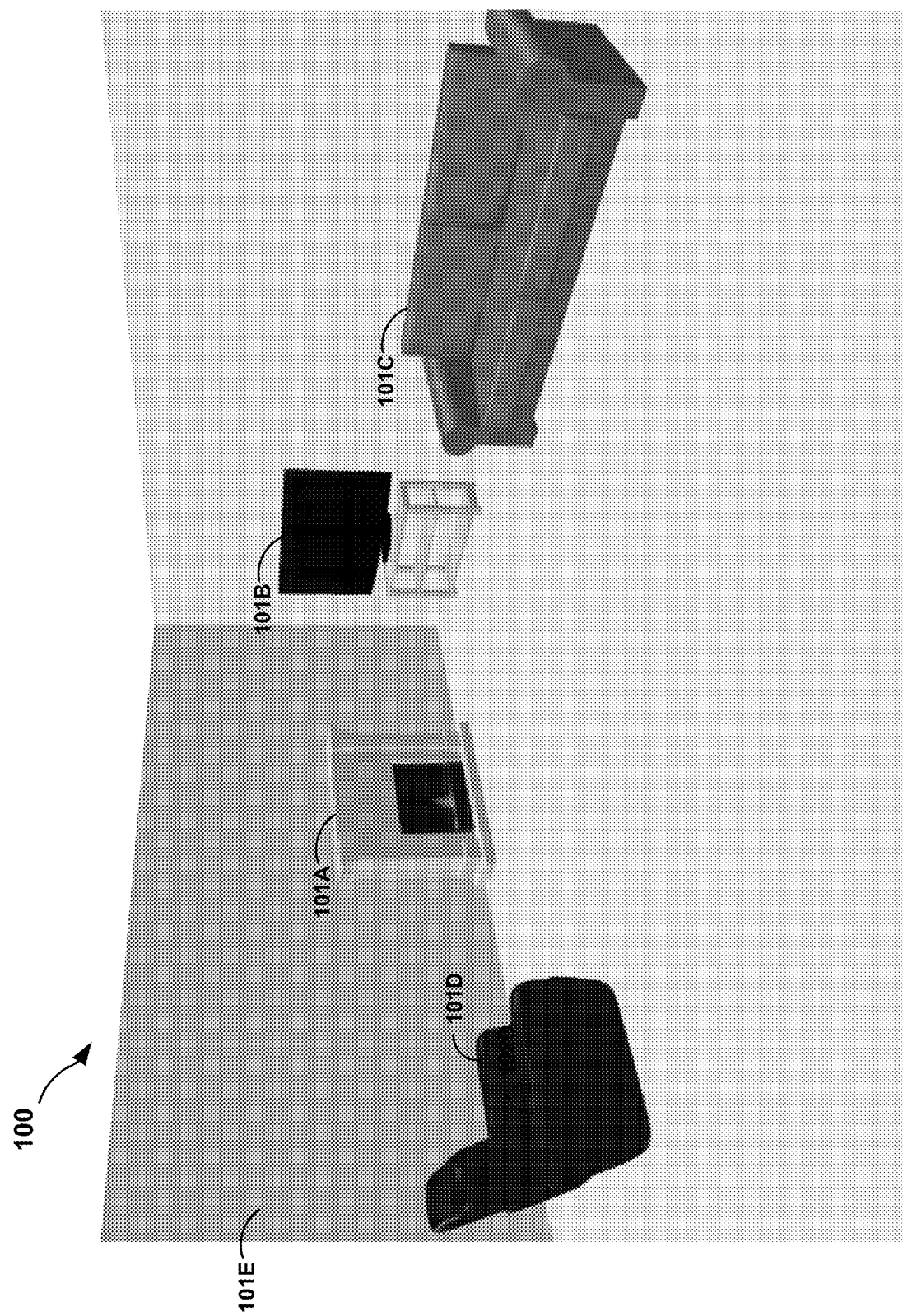
FIG. 1A depicts an example physical environment used to illustrate aspects of the disclosure.

FIG. 1A depicts an example physical environment 100 used to illustrate aspects of the disclosure. In the example illustrated in FIG. 1A, example physical environment 100 includes physical objects 101A-101E (collectively referred to as "physical objects 101"). In particular, example physical environment 100 includes a fireplace 102A, a television 101B, a couch 101C, a chair 101D, and walls 101E. A physical environment 100 may include fewer or more than the physical objects 102 shown in the example illustrated in FIG. 1A. Additionally, a physical environment may include different items than shown in FIG. 1A. For example, a physical environment may include plants, stairs, other types of furniture, etc.

In the example illustrated in FIG. 1A, physical environment 100 is a room. Other types of physical environments are possible. For example, a physical environment can be an outdoor space in which the physical objects include trees, bushes, shrubs, fences, cars, bikes etc. Further, a physical environment can be an entire floor of a building. The aspects described herein are not limited to any particular type of physical environment.

Figure 1B:
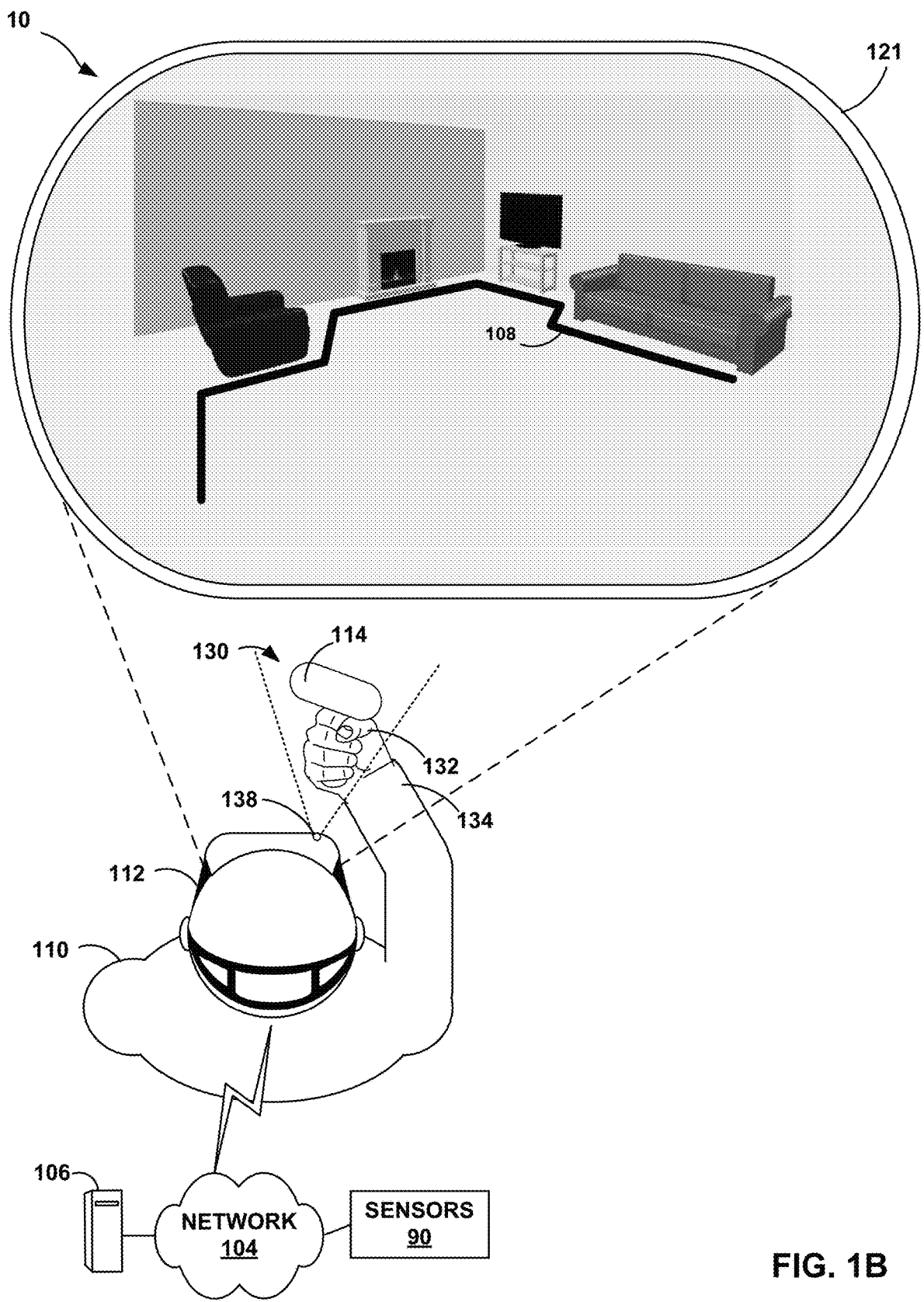
FIG. 1B is an illustration depicting an example artificial reality system and virtual boundary definition for the example physical environment illustrated in FIG. 1A, in accordance with the techniques of the disclosure.

FIG. 1B is an illustration depicting an example artificial reality system and virtual boundary definition for the example physical environment illustrated in FIG. 1A, in accordance with the techniques of the disclosure. In the example of FIG. 1A, artificial reality system 10 includes head mounted device (HMD) 112. As shown, HMD 112 is typically worn by user 110 and includes an electronic display and optical assembly for presenting artificial reality content and video to user 110. In addition, HMD 112 includes one or more motion sensors (e.g., accelerometers) for tracking motion of the HMD 112 and may include one or more image capture devices 138, e.g., cameras, infrared (IR) detectors, Doppler radar, line scanners and the like, for capturing image data of the surrounding physical environment (e.g., physical environment 100 of FIG. 1A).

In some example implementations HMD 112 operates as a stand-alone, mobile artificial reality system. In other implementations, an artificial reality system 10 can optionally include a console 106 and/or one or more external sensors 90 in addition to, or instead of HMD 112. In the example illustrated in FIG. 1A, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium.

In some aspects, a user 110 can use functionality provided by HMD 112 and/or console 106 to establish a virtual boundary 108 that is to be associated with a physical environment. For example, the user may use a hand-held device 114 to "draw" an outline of the virtual boundary 108 that is to be associated with a physical environment such as the physical environment 100 (FIG. 1A). For example, HMD 112 may capture video 121 of the surrounding physical environment. User 110 can use the hand-held device 114 to manipulate a drawing cursor that appears within the video content 121 to define the virtual boundary 108, that also appears in the video content 121. When the user 110 is finished defining the virtual boundary 108, the virtual boundary 108 can be associated with the physical environment 100. In the example illustrated in FIG. 1B, the virtual boundary has been defined by drawing a base of the virtual boundary on a floor. The virtual boundary can extend up from the base defined by the user such that the virtual boundary forms a virtual wall. The base of the virtual boundary is not limited to a floor.

A user 110 may begin an artificial reality experience, such as a fully or partially immersive artificial reality experience. The artificial reality system 10 can analyze a pose of HMD 112 and hand-held controller 114, and use the pose information to predict a motion path for one or more body portions of the user 110. If the predicted motion path crosses or comes within a threshold distance of the virtual boundary 108, HMD 112 may display a warning to the user that they are too close to, or have crossed, the virtual boundary, thereby allowing the user to avoid collisions with physical objects that are "protected" by the virtual boundary 108. In the example illustrated in FIG. 1B, the user has established a virtual boundary 108 near the fireplace 101A, television 101B, couch 101C, and chair 101D of the physical environment 100 of FIG. 1A.

Figure 1C:
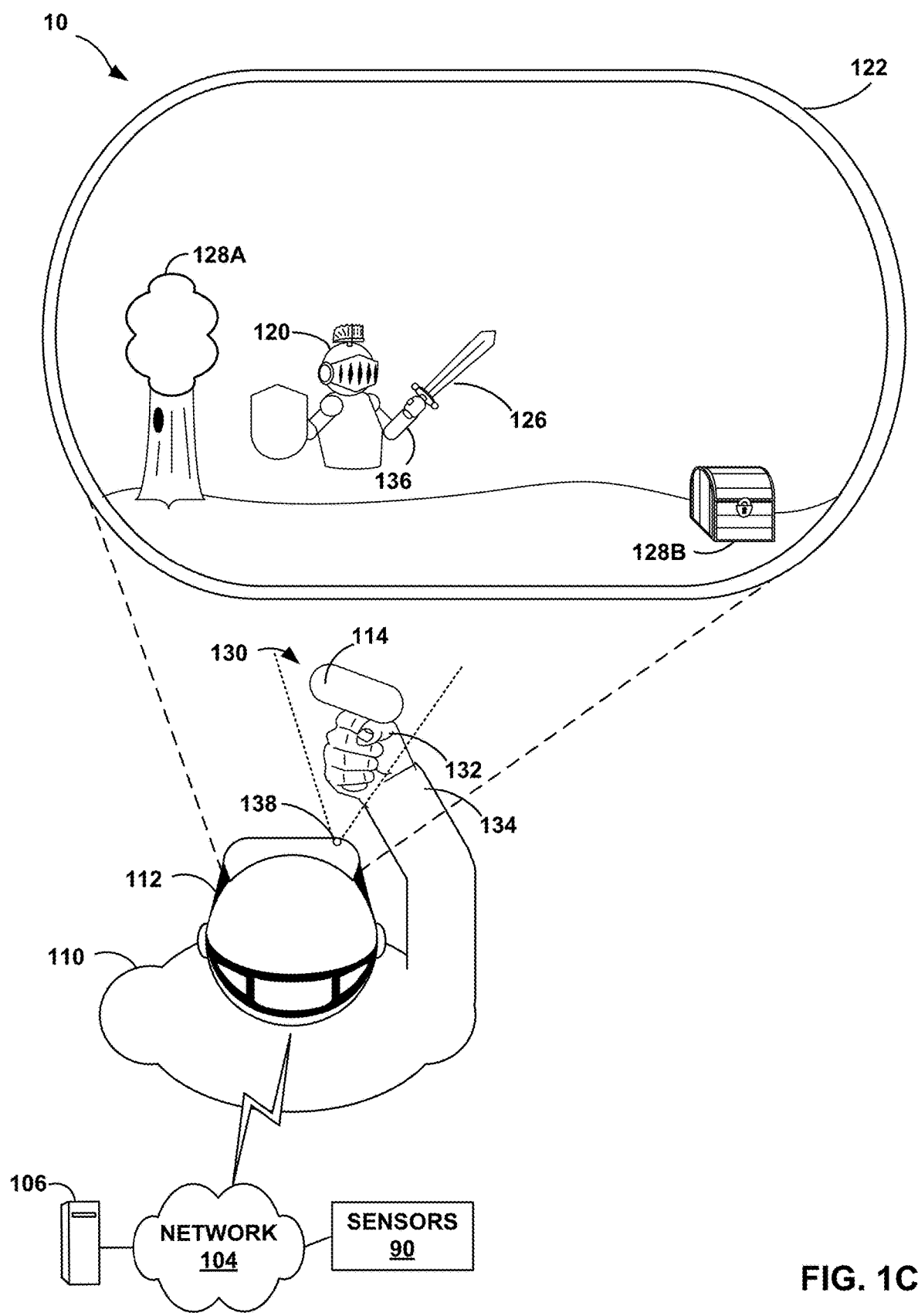
FIG. 1C is an illustration providing further details of the example artificial reality system prior to virtual boundary activation, in accordance with the techniques of the disclosure.

FIG. 1C is an illustration providing further details of the example artificial reality system prior to virtual boundary activation, in accordance with the techniques of the disclosure. In general, artificial reality system renders artificial reality content 122 for display to user 110. In the example of FIG. 1C, user 110 views the artificial reality content 122 constructed and rendered by an artificial reality application executing on HMD 112 and/or console 106. In some aspects, the artificial reality content 122 may be completely computer constructed, as in the case of a fully immersive VR experience. For example, the artificial reality content 122 may not include representations of some or all the physical objects in the physical environment occupied by user 110. As one example, artificial reality content 122 may be a consumer gaming application in which user 110 is rendered as avatar 120 with one or more virtual objects 126, 128A, 128B. In some aspects, the artificial reality content 122 can include representations of physical objects in a different physical environment from that of user 110. As an example, the artificial reality content may be associated with a video conferencing application, a virtual navigation application, or a virtual travel application. In the case of a video conferencing application, the artificial reality content may include the physical objects in a room occupied by a participant of the video conferencing application other than user 110. In the case of a virtual travel application, the physical object may include the physical objects in a travel destination. In such cases, the artificial reality content 122 may include physical objects that are in a separate physical environment from that occupied by the user 110 but does not include physical objects in the same physical environment as that occupied by the user 110.

During operation, the artificial reality application constructs artificial reality content 122 for display to user 110 by tracking and computing pose information for a frame of reference, typically a viewing perspective of HMD 112. Using HMD 112 as a frame of reference, the artificial reality application renders 3D artificial reality content 122. During this process, the artificial reality application uses sensed data received from HMD 112 and the one or more hand-held devices 114, such as movement information and user commands, and, in some examples, data from any external sensors 90, such as external cameras, to capture 3D information within the real world, physical environment, such as motion by user 110 and/or motion of the one or more hand-held devices 114. Based on the sensed data, the artificial reality application determines a current pose for the frame of reference of HMD 112, a current pose for the one or more hand-held devices 114 and, in accordance with the current poses of the HMD 112 and hand-held devices 114, renders the artificial reality content 122. In the example illustrated in FIG. 1C, the artificial reality application can render virtual objects such as virtual sword 126 based on a pose of the HMD 112 and one or more hand-held devices 114.

In some aspects, the artificial reality content 122 may not include any representations of the physical objects in a location occupied by the user 110. For example, in the case of a totally immersive VR experience such as that shown in FIG. 1C, the artificial reality content 122 may be generated by one or more processors according to the artificial reality application. Thus, the user 110 may not be fully aware of the location of physical objects in the physical environment because they are not presented as part of the artificial reality content 122. In order to prevent collisions with physical objects in the user's location, the artificial reality system 10 may generate and present a visual warning to the user 110 if the user 110, or portion of the user 110 (e.g., a body segment such as an arm, leg etc.) is within a threshold distance of a virtual boundary 108 (FIG. 1B) or is predicted to cross the virtual boundary 108.

FIG. 1D is an illustration providing further details of the example artificial reality system 10 after virtual boundary activation, in accordance with the techniques of the disclosure. In the example illustrated in FIG. 1D, user 110 has moved their hand 132 towards the virtual boundary 108 established in front of fireplace 101A and television 101B in the location occupied by the user 110. The artificial reality system 110 determines that a predicted path of the hand places the hand at a distance 140 that is less than a threshold distance from the virtual boundary 108. As a result, the artificial reality system 10 generates and presents warning content 124 on the HMD 112 display. The predicted path of the hand may be based on movement of the hand-held controller 114, the pose of the hand-held controller, the pose of the HMD 112, and motion constraints associated with joints such as the user's wrist, elbow and shoulder. In the example implementation illustrated in FIG. 1D, the warning content 124 comprises a grid. In other example implementations, the warning content 124 can comprise textual content, icon, image, or other content for display on the HMD 112 display.

The predicted paths of other portions of the user 110's body may also be determined and used to determine if warning content 124 should be generated and presented to the user. For example, the artificial reality system 10 can determine a predicted path for the user 110's elbow based on motion of the hand-held controller 114, the pose of the hand-held controller 114, the pose of the HMD 112, and motion constraints. If the distance 142 of the predicted path of the user 110's elbow is within a threshold distance of the virtual boundary 108, artificial reality system 10 can generate and present warning content 124.

Figure 1E:
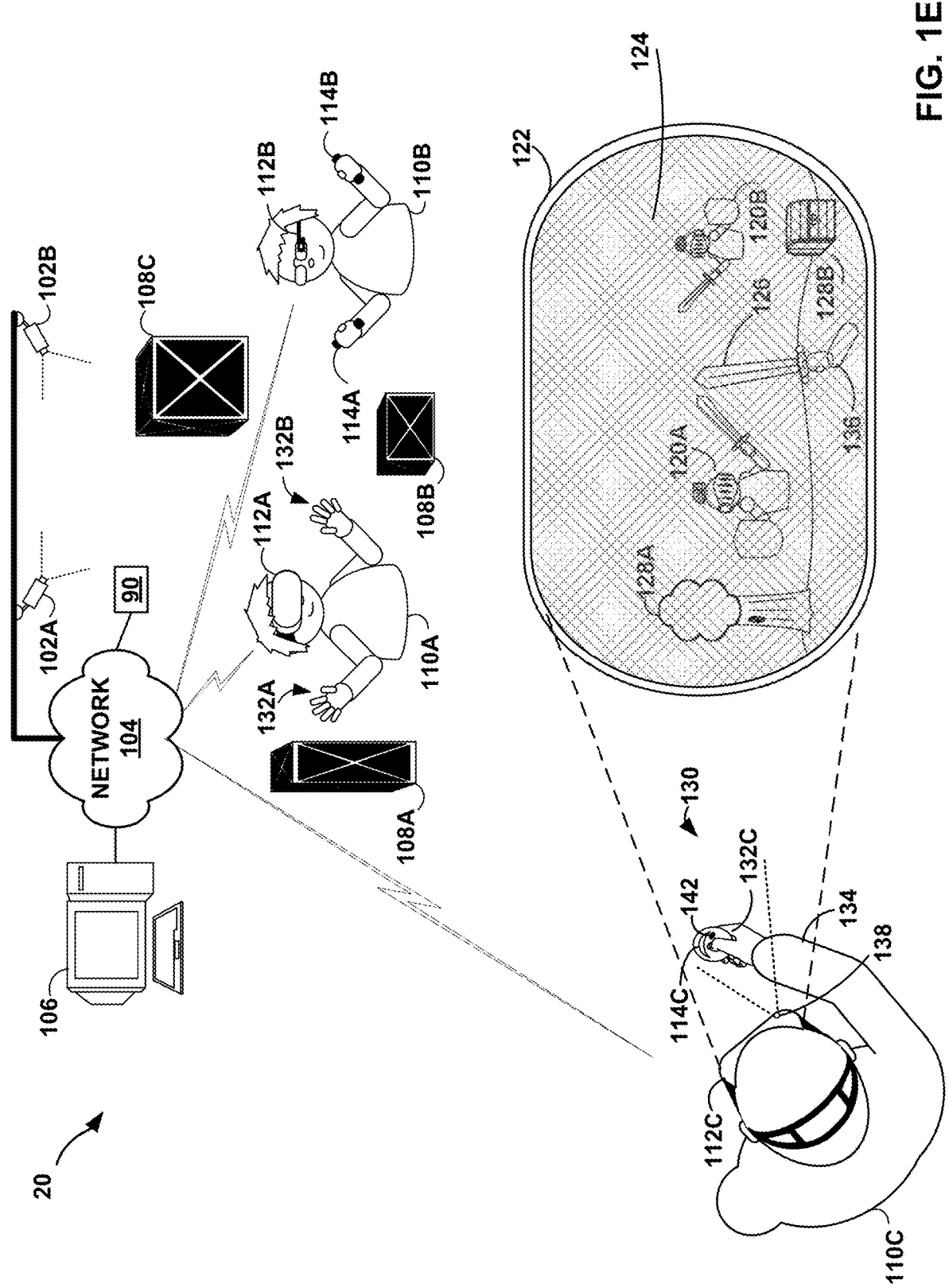
FIG. 1E is an illustration providing further details of the example artificial reality system after virtual boundary activation, in accordance with the techniques of the disclosure.

FIG. 1E is an illustration depicting another example artificial reality system 20 prior to virtual boundary activation, in accordance with the techniques of the disclosure. In the example of FIG. 1E, artificial reality system 20 includes external cameras 102A and 102B (collectively, "external cameras 102"), HMDs 112A-112C (collectively, "HMDs 112"), hand-held devices 114A, 114B and 114C (collectively, "hand-held devices 114"), console 106, and sensors 90. As shown in FIG. 1E, artificial reality system 20 represents a multi-user environment in which an artificial reality application executing on HMDs 112 and/or console 106 presents artificial reality content to each of users 110A-110C (collectively, "users 110") based on a current viewing perspective of a corresponding frame of reference for the respective user. That is, in this example, the artificial reality application constructs artificial reality content by tracking and computing pose information for a frame of reference for each of HMDs 112 and respective hand-held devices 114. As one example, the artificial reality application may render, based on a current viewing perspective determined for HMD 112C, immersive artificial reality content 122 having virtual objects 128A-128B (collectively, "virtual objects 128"). Further, from the perspective of HMD 112C, artificial reality system 20 renders avatars 120A, 120B based upon the estimated positions for users 110A, 110B, respectively. Also, the artificial reality system 20 can render graphical objects based on the poses of the hand-held devices 114 as determined by the artificial reality system 20.

Each of HMDs 112 concurrently operates within artificial reality system 20. In the example of FIG. 1E, each of users 110 may be a "player" or "participant" in the artificial reality application, and any of users 110 may be a "spectator" or "observer" in the artificial reality application. HMD 112C may operate substantially similar to HMD 112 of FIG. 1C by rendering immersive artificial reality content including virtual objects such as sword 126 based on a determined pose of hand-held device 114C. Like HMD 112 of FIG. 1D, HMD 112C can determine one or more predicted paths of portions of the corresponding user 110C's body and generate and display warning content 124 if the any of the one or more predicted paths will come within a threshold distance of a virtual boundary defined by the user 110C.

As shown in FIG. 1E, in addition to or alternatively to image data captured via camera 138 of HMD 112C, input data from external cameras 102 may be used to track and detect particular motions, positions and orientations of a user 110, including portions of the user 110's body and poses and motions of hand-held controllers held by a user 110.

Figure 2A:
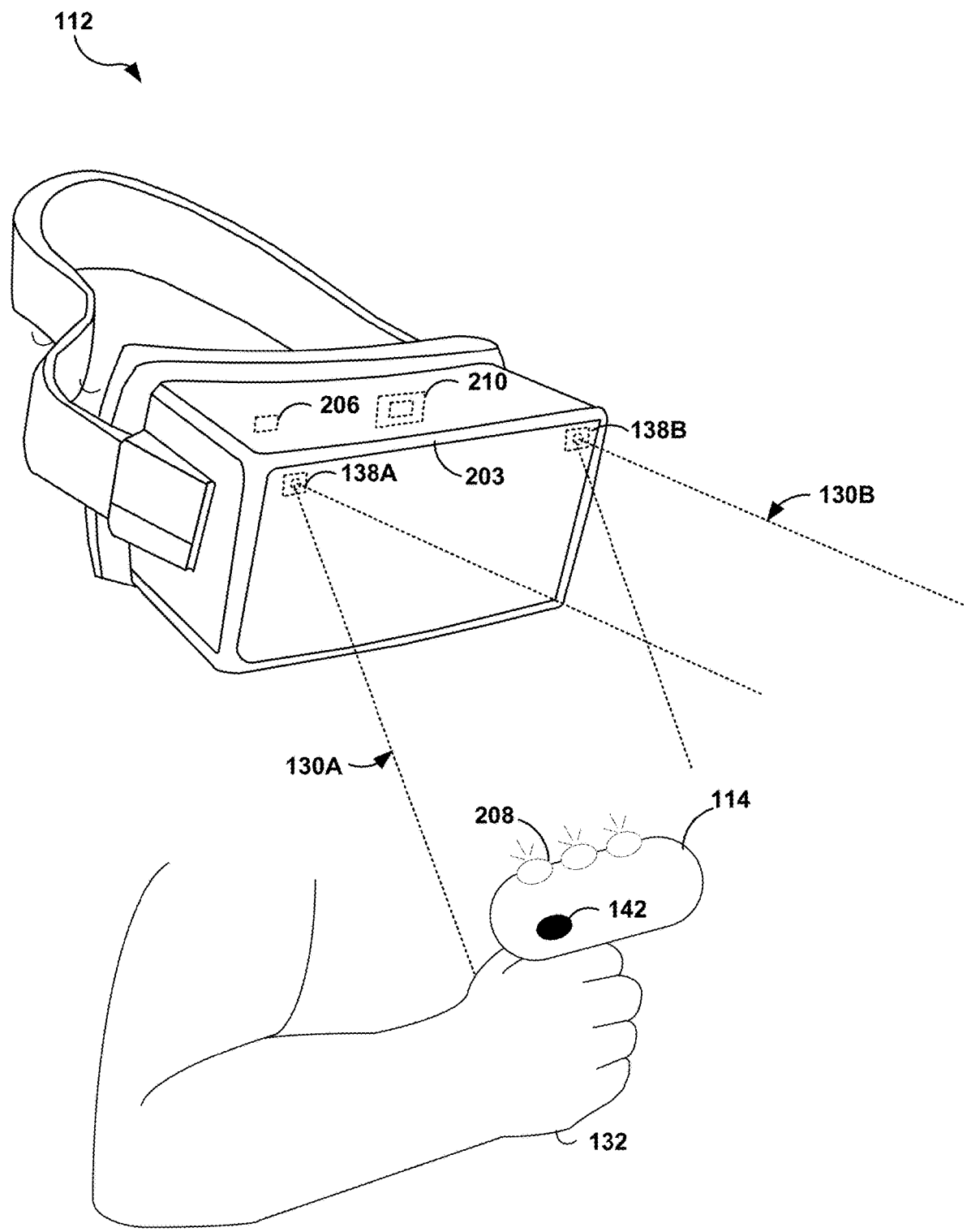
FIG. 2A is an illustration depicting an example HMD that operates in accordance with the techniques of the disclosure.

FIG. 2A is an illustration depicting an example HMD 112 and hand-held device 114 configured to operate in accordance with the techniques of the disclosure. HMD 112 of FIG. 2A may be an example of any of HMDs 112 of FIGS. 1B-1E. HMD 112 may operate as a stand-alone, mobile artificial realty system configured to implement the techniques described herein or may be part of an artificial reality system, such as artificial reality systems 10, 20 of FIGS. 1B-1E.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, IR scanners, laser scanners, Doppler radar scanners, depth scanners, or the like, configured to output image data representative of the physical environment. In some aspects, the image capture devices 138 can capture image data from a visible spectrum and an invisible spectrum of light (e.g., IR light). More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203, and warning content is to be displayed as a result of a predicted path of a portion of a user's body that will come within a threshold distance of a virtual boundary or cross the virtual boundary.

In the example illustrated in FIG. 2A, hand-held device 114 comprises a peripheral device that coexists with HMD 112 and, in some examples, operates as an auxiliary input/output device for HMD 112 in the artificial reality environment. Hand-held device 114 can communicate any detected user input to HMD 112 (and/or console 106 of FIG. 1B) using wireless communications links (e.g., Wi-Fi, near-field communication of short-range wireless communication such as Bluetooth), using wired communication links (not shown), or using other types of communication links. In some examples, hand-held device 114 can include one or more input buttons 142 for providing input to HMD 112. The one or more input buttons 142 may be physical buttons, or they may be virtual buttons, e.g., buttons provided on a touch sensitive screen of hand-held device 114. HMD 112 may receive information regarding the state of one or more buttons 142 on hand-held device 114. For example, HMD 112 may receive information indicating whether button 142 is currently pressed.

Figure 2B:
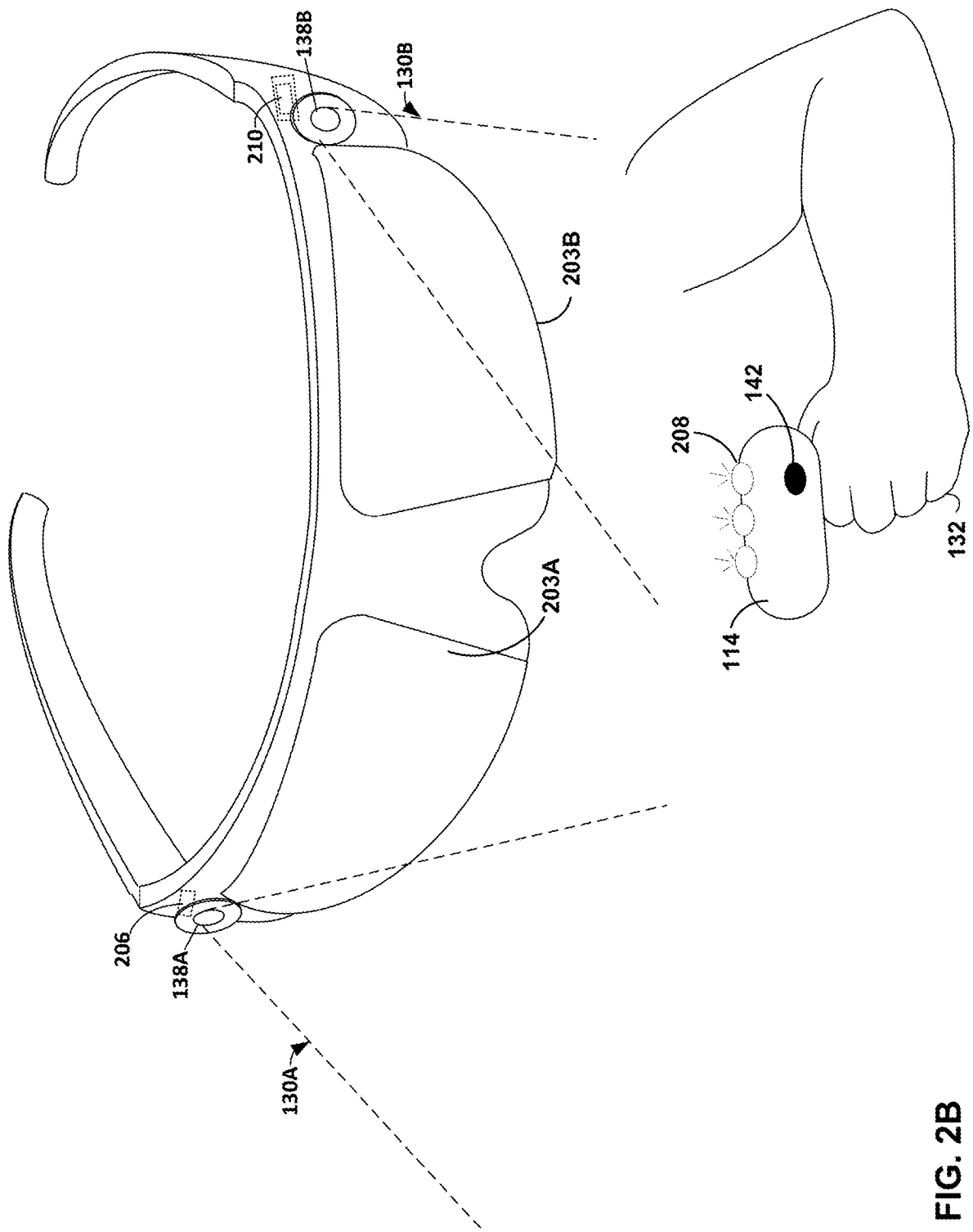
FIG. 2B is an illustration depicting another example HMD that operates in accordance with the techniques of the disclosure.

FIG. 2B is an illustration depicting another example implementation of HMD 112, in accordance with techniques of the disclosure. As shown in FIG. 2B, HMD 112 may take the form of glasses. HMD 112 of FIG. 2B may be an example of any of HMDs 112 of FIGS. 1B-1E. HMD 112 may be part of an artificial reality system, such as artificial reality systems 10, 20 of FIGS. 1B-1E, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in the example illustrated in FIG. 2B, HMD 112 further includes one or more motion sensors 206, such as one or more accelerometers (also referred to as inertial measurement units or "IMUS") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203. In addition to HMD 112, the example illustrated in FIG. 2B includes a hand-held device 114, including one or more buttons 142. The operation and configuration of hand-held device 114 may be the same as described above with reference to FIG. 2A.

Figure 3:
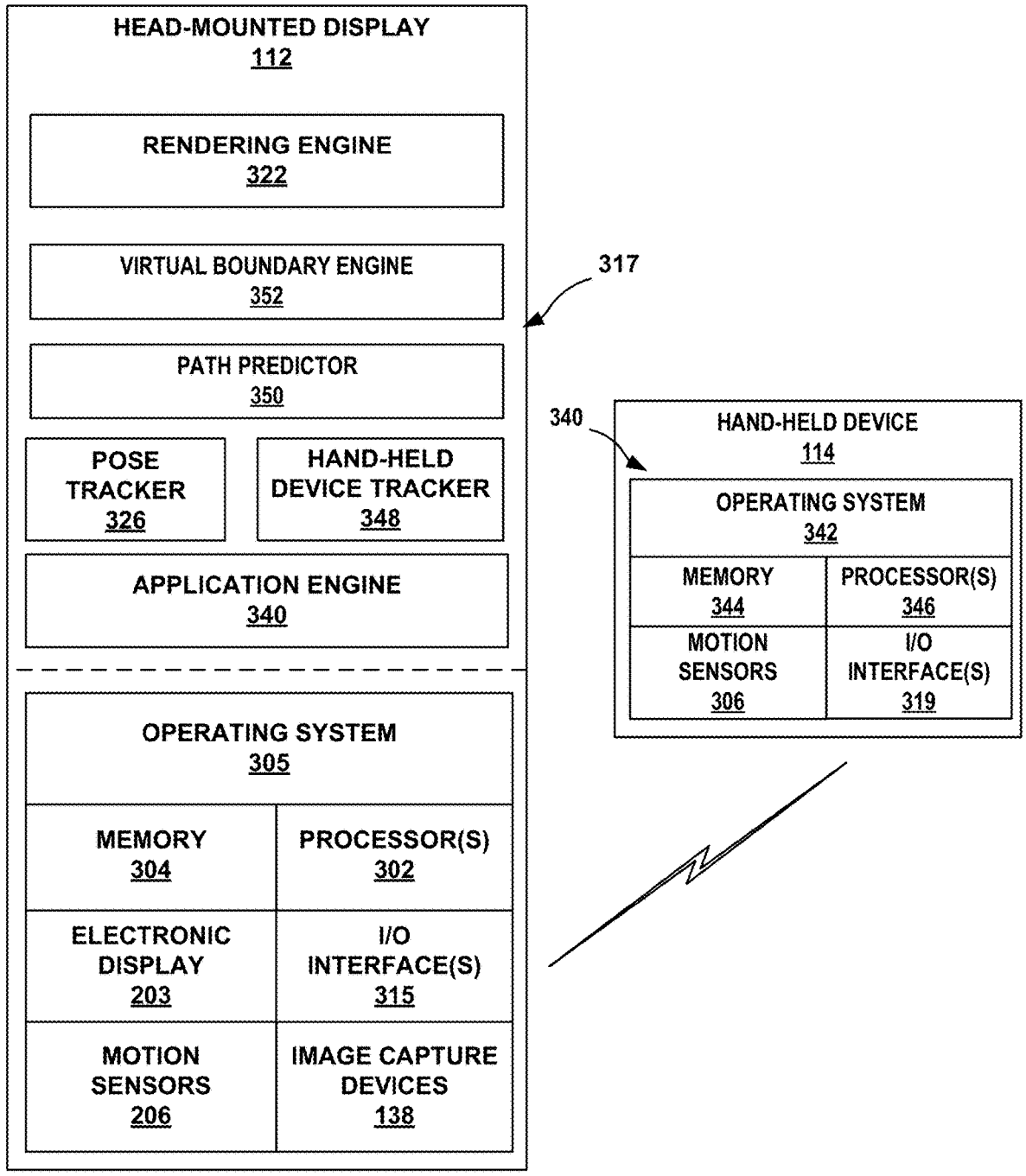
FIG. 3 is a block diagram showing example implementations in which virtual boundary activation is controlled by an example instance of the HMD of the artificial reality systems of FIGS. 1B-1E in accordance with the techniques of the disclosure.

FIG. 3 is a block diagram showing example implementations in which virtual boundary activation is controlled by an example instance of the HMD of the artificial reality systems of FIGS. 1B-1E in accordance with the techniques of the disclosure.

FIG. 3 is a block diagram showing example implementations HMD 112 and hand-held device 114 of artificial reality system 10, 20 of FIGS. 1B-1E. In the example of FIG. 3, HMD 112 performs pose tracking and rendering for HMD 112 and hand-held device 114, such as motion data and image data received from HMD 112 and/or hand-held device 114. HMD 112 predict a motion path of various portions of the user's body in accordance with the techniques described herein based on the image data and other data acquired by HMD 112 along with motion constraints associated with the various portions of the user's body.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Processors 302 are coupled to one or more I/O interfaces 315, which provide I/O interfaces for communicating with hand-held device 114 via similar I/O interfaces 319 and other devices such as a keyboard, game controllers, display devices, image capture devices, other HMDs, and the like. Moreover, the one or more I/O interfaces 315, 319 may include one or more wired or wireless network interface controllers (NICs) for communicating with a network, such as network 104 (FIGS. 1B-1E). Additionally, processors 302 are coupled to electronic display 203, motion sensors 206, and image capture devices 138. In some examples, processors 302 and memory 304 may be separate, discrete components. In other examples, memory 304 may be on-chip memory collocated with processors 302 within a single integrated circuit.

Software applications 317 of HMD 112 operate to provide an overall artificial reality application. In this example, software applications 317 include application engine 340, rendering engine 322, pose tracker 326, hand-held device tracker 348, path predictor 350, and virtual boundary engine 352.

In general, application engine 340 includes functionality to provide and present an artificial reality application, e.g., a gaming application, a teleconference application, a navigation application, an educational application, training or simulation applications, and the like. Application engine 340 may include, for example, one or more software packages, software libraries, hardware drivers, and/or Application Program Interfaces (APIs) for implementing an artificial reality application on HMD 112. Responsive to control by application engine 340, rendering engine 322 generates 3D artificial reality content for display to the user by application engine 340 of HMD 112. In some aspects, application engine 340 provides a fully immersive virtual reality experience in which all, or substantially all of the artificial reality content is generated by the application engine 340 and does not include images representative of physical objects in the physical environment occupied by the user.

Additionally, hand-held device tracker 348 may determine a pose for the hand-held device 114. In some aspects, hand-held device tracker 348 may receive information from sensors on the hand-held device 114 and use the received information to determine a pose for the hand-held device 114. Such information may include information from motion sensors 306. Further, hand-held device tracker may use image data obtained via image capture devices 138 to determine a pose for the hand-held device 114.

Application engine 340 and rendering engine 322 construct the artificial content for display to user 110 in accordance with current pose information for HMD 112 within a frame of reference, typically a viewing perspective of HMD 112, as determined by pose tracker 326 and hand-held device tracker 348. Based on the current viewing perspective, rendering engine 322 constructs the 3D, artificial reality content. During this process, pose tracker 326 operates on sensed data received from HMD 112 and optionally controller measurement data received from hand-held device 114, such as movement information and user commands, and, in some examples, data from any external sensors 90 (FIGS. 1B, 1C), such as external cameras, to capture 3D information within the real-world environment, such as motion by user 110, and/or feature tracking information with respect to user 110. Based on the sensed data, pose tracker 326 determines a current pose for the HMD 112 within the frame of reference of HMD 112.

The application engine 340 and rendering engine 322 may, in accordance with the current pose of the HMD 112, construct and render artificial reality content for display to user 110 via electronic display 203.

Virtual boundary engine 352 maintains data that defines a virtual boundary for a physical location. For example, the data may include the position of the virtual boundary within the physical location. Once defined, the data associated with the virtual boundary may be stored, for example, in a persistent storage (not shown) of the HMD 112 or console 106. The data may also include threshold data defining one or more thresholds for the virtual boundary. For example, one threshold may be defined for use when the artificial reality system detects that the user is standing, and a second threshold may be defined for use when the artificial reality system detects that the user is sitting.

Path predictor 350 may use a current pose for the HMD 112 and the current pose of the hand-held device 114 to determine a current body position for the user. For example, path predictor 350 may use the relationship between the position of the hand-held device 114 and the HMD 112, along with their respective orientations and body configuration parameters to determine skeletal positions of the user's joints. In some aspects, path predictor 350 can use an estimated arm length to determine estimated skeletal positions associated with the user's shoulder, elbow and wrist. In addition, path predictor 350 can determine a current motion of the HMD 112 and/or hand-held device 114. Further, path predictor 350 can determine motion constraints based on the current body position and ranges of motion associated with the skeletal positions to determine one or more predicted motion paths for the skeletal positions. The ranges of motion data may be based on prior detection and analysis of the range of motion of human joints.

Other prior knowledge may be used to determine a predicted motion path. For example, the statistical prevalence or frequency of a particular pose may be used to determine a predicted motion path. Additionally, prior knowledge of the frequency of particular sequences of skeletal poses (e.g., prior motions) may be used to determine a predicted motion path.

The virtual boundary engine 352 can compare the one or more predicted motion paths with a virtual boundary to determine if the predicted motion path comes within a threshold distance of the virtual boundary or crosses the virtual boundary. The virtual boundary engine 352 can generate warning content (e.g., warning content 124, FIG. 1D) for presentation on electronic display 203 if it determines that the predicted motion path comes within a threshold distance of the virtual boundary or crosses the virtual boundary.

Hand-held device 114 may be a device that provides for user interaction with artificial reality system 10, 20. In the example illustrated in FIG. 3, hand-held device 114 includes one or more processors 346, memory 344, motion sensors 306, and I/O interface 319. The one or more processors 346 and memory 344 may provide a computer platform for executing an operating system 342, which may be an embedded, real-time multitasking operating system, for instance, or other type of operating system. In turn, operating system 346 provides a multitasking operating environment for executing one or more software components. In some examples, processors 346 and memory 344 may be separate, discrete components. In other examples, memory 344 may be on-chip memory collocated with processors 346 within a single integrated circuit.

Hand-held device 114 includes I/O interfaces 319 that provide interfaces to devices on the hand-held device 114 such as button devices on the hand-held controller 114 or touch sensitive surfaces on the hand-held controller 114. Further, I/O interfaces 319 may interfaces for communicating with an associated HMD 112. The communications between hand-held device 114 and HMD 112 may include the status of buttons on the hand-held device, for example, whether a button is pressed or not.

As shown in FIG. 3, in this example, hand-held device 114 further includes one or more motion sensors 306, such as one or more accelerometers (also referred to as IMUs) that output data indicative of current acceleration of hand-held device 114, GPS sensors that output data indicative of a location or position of hand-held device 114, radar or sonar that output data indicative of distances of hand-held device 114 from various objects (e.g., from a wall or other surface), or other sensors that provide indications of a location, position, and/or orientation of hand-held device 114 or other objects within a physical environment.

In some aspects, hand-held device 114 may be a proprietary hand-held device that is designed specifically for use with artificial reality system 10, 20. In further aspects, hand-held device 114 may be a smart phone having software enabling the smart phone to provide the functionality described above to an HMD 112 or console 106.

Further details on the operation of pose tracker 326, path predictor 350 and virtual boundary engine 352 are provided below with respect to FIGS. 5, 6 and 7A-7D.

Figure 4:
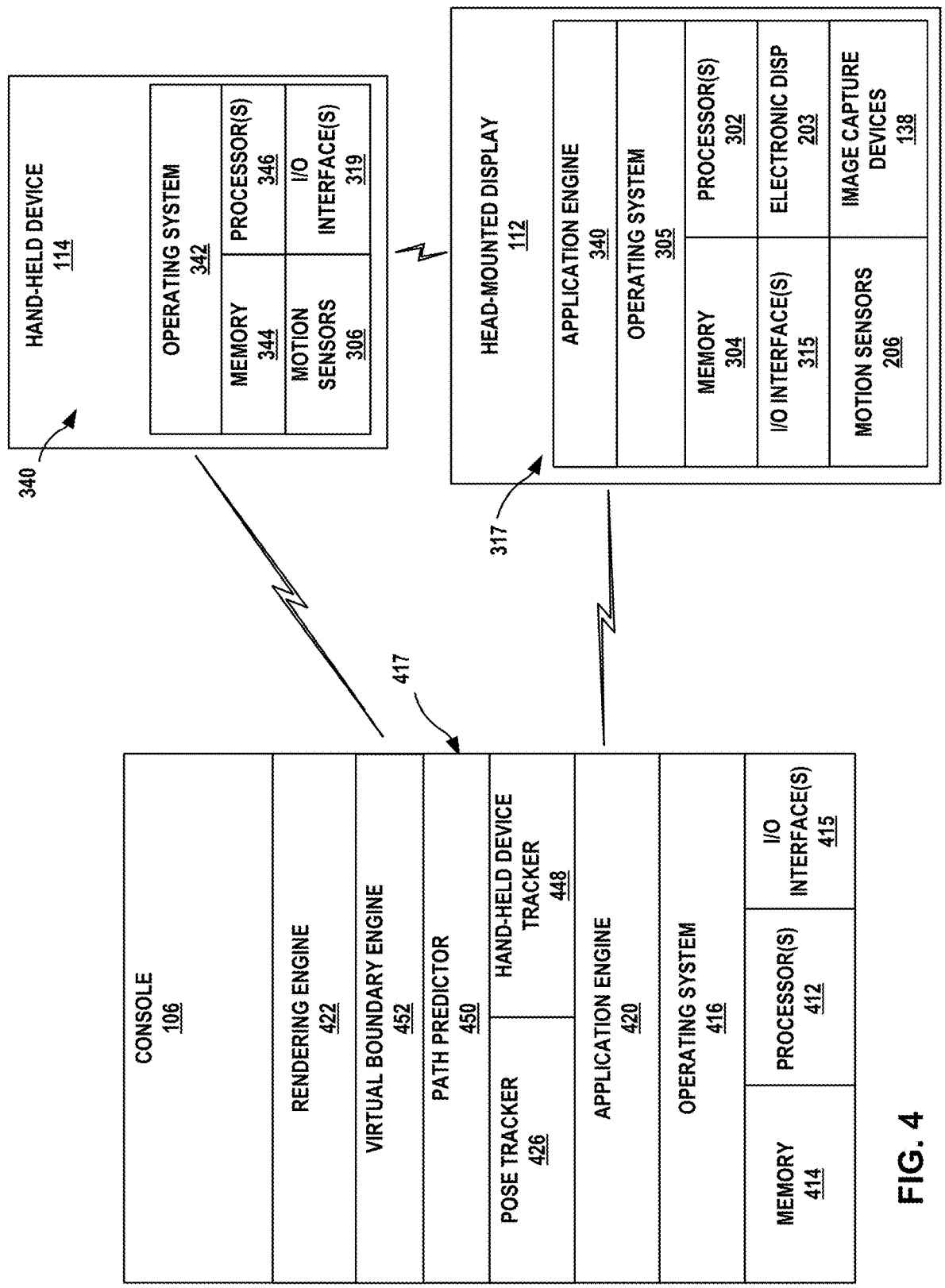
FIG. 4 is a block diagram showing example implementations in which virtual boundary activation is controlled by example instances of the console and the HMD of the artificial reality systems of FIGS. 1B-1E.

FIG. 4 is a block diagram showing example implementations in which virtual boundary activation is controlled by example instances of the console and the HMD of the artificial reality systems of FIGS. 1B-1E.

FIG. 4 is a block diagram showing example implementations of console 106, HMD 112, and hand-held device 114 of artificial reality system 10, 20 of FIGS. 1B, 1C, and 1E. In the example of FIG. 4, console 106 performs pose tracking and rendering for HMD 112 in accordance with the techniques described herein based on sensed data, such as motion data received from an HMD 112 and/or hand-held device 114, and image data received from HMD 112 and/or external sensors. Additionally, console 106 may maintain a virtual boundary for a physical location and may generate warning content when one or more portions of the body of the user come near to or are predicted to cross the virtual boundary.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Moreover, processor(s) 302 are coupled to electronic display 203, motion sensors 206, and image capture devices 138.

In general, console 106 is a computing device that processes image and tracking information received from HMD 112 and/or cameras 102 (FIG. 1E), and measurement data from hand-held device 114 to perform pose tracking, and content rendering for HMD 112 and hand-held device 114. In some examples, console 106 is a single computing device, such as a server, workstation, a desktop computer, a laptop, or gaming system. In some examples, at least a portion of console 106, such as processors 412 and/or memory 414, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 4, console 106 includes one or more processors 412 and memory 414 that, in some examples, provide a computer platform for executing an operating system 416, which may be an embedded, real-time multitasking operating system, for instance, or other type of operating system. In turn, operating system 416 provides a multitasking operating environment for executing one or more software components 417. Processors 412 are coupled to one or more I/O interfaces 415, which provide I/O interfaces for communicating with external devices, such as hand-held controller 114, a keyboard, game controllers, display devices, image capture devices, HMDs, and the like. Moreover, the one or more I/O interfaces 415 may include one or more wired or wireless network interface controllers (NICs) for communicating with a network, such as network 104. Each of processors 302, 346, 412 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 344, 414 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 417 of console 106 operate to provide an overall artificial reality application. In this example, software applications 417 include application engine 420, rendering engine 422, pose tracker 426, hand-held device tracker 448, virtual boundary engine 452 and path predictor 450. In general, application engine 420 includes functionality to provide and present an artificial reality application, e.g., a gaming application, a teleconference application, a navigation application, an educational application, training or simulation applications, and the like. Application engine 420 may include, for example, one or more software packages, software libraries, hardware drivers, and/or Application Program Interfaces (APIs) for implementing an artificial reality application on console 106. Responsive to control by application engine 420, rendering engine 422 generates 3D artificial reality content for display to the user by application engine 340 of HMD 112. In some aspects, application engine 420 provides a fully immersive virtual reality experience in which all, or substantially all of the artificial reality content is generated by the application engine 420 and does not include images representative of physical objects in the physical environment occupied by the user.

Additionally, hand-held device tracker 448 may determine a pose for the hand-held device 114. In some aspects, hand-held device tracker 448 may receive information from sensors on the hand-held device 114 and use the received information to determine a pose for the hand-held device 114. Such information may include information from motion sensors 306. Further, hand-held device tracker 448 may use image data obtained via image capture devices 138 of HMD 112 to determine a pose for the hand-held device 114.

Application engine 420 and rendering engine 422 construct the artificial content for display to user 110 in accordance with current pose information for HMD 112 within a frame of reference, typically a viewing perspective of HMD 112, as determined by pose tracker 426 and hand-held device tracker 448. Based on the current viewing perspective, rendering engine 422 constructs the 3D, artificial reality content which may in some cases be overlaid, at least in part, upon the real-world 3D environment of user 110. During this process, pose tracker 426 operates on sensed data received from HMD 112 and hand-held device 114, such as image data from sensors on HMD 112, motion sensor data from hand-held device 114, and, in some examples, data from any external sensors 90 (FIGS. 1B, 1C), such as external cameras, to capture 3D information within the real-world environment, such as motion by user 110, motion of hand-held device 114, and/or feature tracking information with respect to user 110. Based on the sensed data, pose tracker 426 determines a current pose for the HMD 112 and the hand-held device 114 within the frame of reference of HMD 112 and, in accordance with the current poses, constructs the artificial reality content for communication, via the one or more I/O interfaces 315, 415, to HMD 112 for display to user 110.

Virtual boundary engine 452 maintains data that defines a virtual boundary for a physical location. For example, the data may include the position of the virtual boundary within the physical location. Once defined, the data associated with the virtual boundary may be stored, for example, in a persistent storage (not shown) of the console 106. The data may also include threshold data defining one or more thresholds for the virtual boundary. For example, one threshold may be defined for use when the artificial reality system detects that the user is standing, and a second threshold may be defined for use when the artificial reality system detects that the user is sitting.

Path predictor 450 may use a current pose for the HMD 112 and the current pose of the hand-held device 114 to determine a current body position for the user. For example, path predictor 450 may use the relationship between the position of the hand-held device 114 and the HMD 112, along with their respective orientations and body configuration parameters to determine skeletal positions of the user's joints. In some aspects, path predictor 450 can use an estimated arm length to determine estimated skeletal positions associated with the user's shoulder, elbow and wrist. In addition, path predictor 450 can determine a current motion of the HMD 112 and/or hand-held device 114. Further, path predictor 450 can determine motion constraints based on the current body position and ranges of motion associated with the skeletal positions to predict one or more predicted motion paths for the skeletal positions.

The virtual boundary engine 452 can compare the one or more predicted motion paths with a virtual boundary to determine if the predicted motion path comes within a threshold distance of the virtual boundary or crosses the virtual boundary. The virtual boundary engine 452 can generate warning content (e.g., warning content 124, FIG. 1D) for presentation on electronic display 203 of HMD 112 if it determines that the predicted motion path comes within a threshold distance of the virtual boundary or crosses the virtual boundary.

Further details on the operation of pose tracker 426, path predictor 450 and virtual boundary engine 452 are provided below with respect to FIGS. 5, 6 and 7A-7D.

Figure 5:
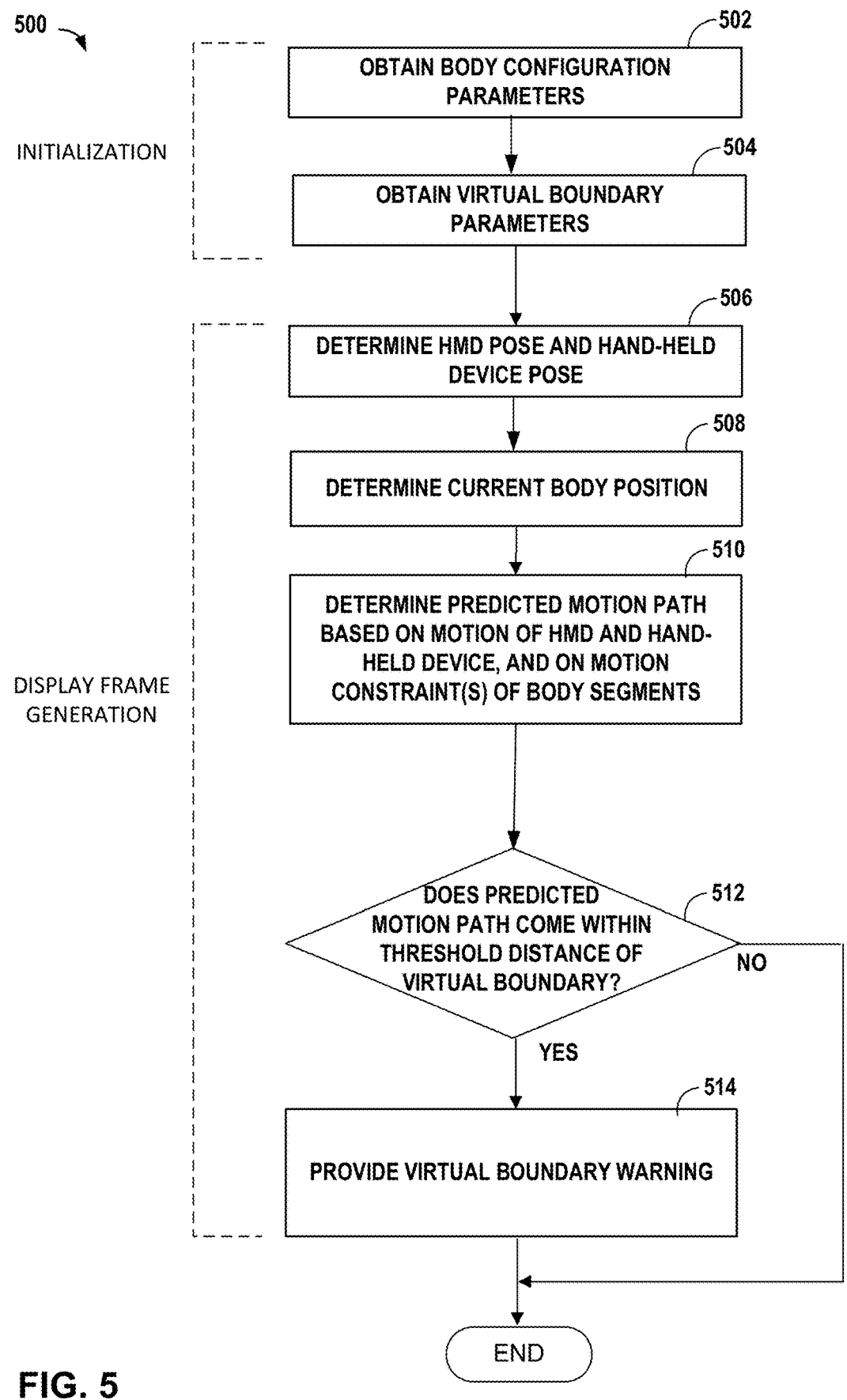
FIG. 5 is a flowchart illustrating example operations of a method for controlling virtual boundary activation in accordance with aspects of the disclosure.
Figure 6:
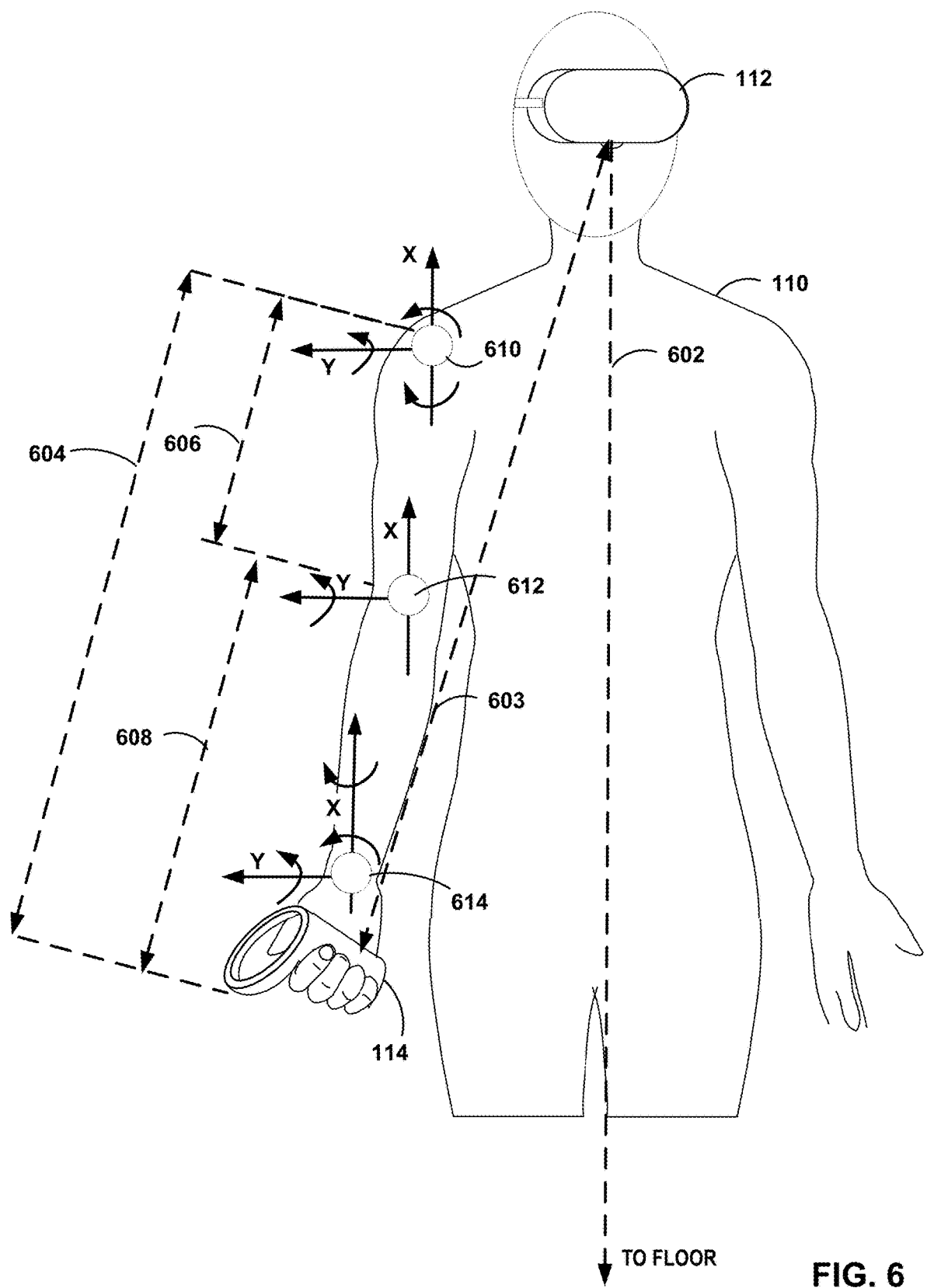
FIG. 6 illustrates example parameters and constraints used to control virtual boundary activation in accordance with aspects of the disclosure.

FIG. 5 is a flowchart 500 illustrating example operations of a method for controlling virtual boundary activation in accordance with aspects of the disclosure. Some or all of the example operations described in flowchart 500 may be performed periodically or in response to an event. For example, some or all of the example operations may be performed as part of a response to a display frame generation event where the event causes an artificial reality system 10, 20 to render a display frame for presentation on HMD 112. FIG. 5 will be described with respect to the example illustrated in FIG. 6.

Artificial reality system 10, 20 can obtain body configuration parameters (502). In some aspects, values for some or all of the body configuration parameters can be estimated. For example, referring to FIG. 6, in some aspects, a height of the user can be estimated by determining a distance 602 from the HMD 112 to the floor of the physical location. There is typically a correlation between height and arm length. Thus, an arm length 604 of the user can be estimated based on the estimated height of the user. Alternatively, or in addition, the artificial reality system can determine an arm length by estimating the distance from the HMD 112 to the hand-held controller 114. For example, the user may be prompted to extend their arm to its full length and the artificial reality system 10, 20 can estimate arm length based on the distance from the HMD 112 to the hand-held controller 114 when the arm is fully extended. Further, arm length may be estimated by determining a convex hull of hand motions, inferring arm length from the hand trajectories, or other techniques.

In some aspects, an upper arm length 606 and a forearm length 608 can be estimated based on the estimated arm length 604. Similar estimation techniques can be used for other body segments such as the legs, trunk, neck etc.

In some aspects, some or all of the body configuration parameters may be provided by the user. For example, the user may enter a value for their height, and the artificial reality system may estimate arm length based on the entered height value.

Returning to FIG. 5, virtual boundary engine 352, 452 can obtain virtual boundary parameters (504). For example, in some aspects, virtual boundary engine 352, 452 can obtain previously stored parameters that define a virtual boundary for the user's present location. In some aspects, the user may be prompted to use a hand-held controller 114 or other device to define a virtual boundary for the user's current location. Further, the virtual boundary engine can obtain one or more thresholds associated with the virtual boundary.

In some aspects, the body configuration parameters and the virtual boundary parameters can be obtained as part of an initialization process for a virtual reality session. Once obtained, the body configuration parameters and the virtual boundary parameters can be used during display frame generation to determine if some or all of the user's body has come within a threshold distance of the virtual boundary or crossed the virtual boundary.

Pose tracker 326, 426 can determine a pose for the HMD 112 and hand-held device tracker 348, 448 can determine a pose for hand-held device 114 (506). The poses can represent a position and orientation of the HMD 112 and hand-held device 114.

Path predictor 350, 450 can use the HMD pose and hand-held device pose to determine a current body position for portions of the user's body (508). In some aspects, one or more positions can be estimated based on the HMD pose and hand-held device pose. Referring again to FIG. 6, path predictor 350, 450 can estimate a shoulder position 610 based on the pose of HMD 112 and the user's estimated height. Path predictor 350, 450 can estimate a user's wrist position 614 based on the HMD pose and the hand-held device pose. Path predictor 350, 450 can estimate a user's elbow position 612 based on the estimated shoulder position 610, the estimated wrist position 614 the estimated arm length 604, estimated upper arm length 606, and/or estimated forearm length 608. For example, path predictor 350, 450 can determine that the user's arm is bent, and the degree of bending based on determining from the HMD pose and hand-held device pose that the distance between the shoulder position 610 and wrist position 614 is less than the total arm length 104. Further, the path predictor 350, 450 can estimate the elbow position 612 based on the orientation of the hand-held device 114. For example, an elbow may be estimated to be near the user's trunk when the orientation of the hand-held device 114 is vertical or nearly vertical. The elbow may be estimated as a position away from the user's trunk when the orientation of the hand-held controller is horizontal, or nearly horizontal, or when an estimated degree of rotation of the user's wrist (based on the hand-held device pose) exceeds a threshold.

Returning to FIG. 5, path predictor 350, 450 can also determine a predicted motion path for based on motion of the HMD 112 and hand-held device 114, and one or more motion constraints associated with segments of the user's body such as skeletal positions (510). For example, path predictor 350, 450 can compare the current pose of the HMD 112 and hand-held device 114 with previous poses to determine a velocity and direction of motion for the HMD 112 and hand-held device 114. The velocity and direction of motion of the HMD 112 and hand-held device 114 as constrained by the motion constraints of the of the skeletal positions can be used by path predictor 350, 450 determine one or more predicted motion paths for the skeletal positions.

Referring again to FIG. 6, the motions constraints for various skeletal points may be based on the degrees of freedom (DoF) of motion and a range of motion. For example, there may be six DoF associated with shoulder position 610. The shoulder position 610 can be translated in the X, Y and Z directions, and can also be rotated about the X, Y and Z axis. There may be a single DoF associated with the elbow position 612. The elbow may be rotated about the Y axis. There may be three DoF associated with the wrist position 610. The wrist may be rotated about the X, Y and Z axes. Additionally, constraints on the motion of one skeletal position may be dependent on constraints associated with another skeletal position. For example, the elbow position 612 can be further constrained by the position and rotation of the shoulder at shoulder position 610 and the upper arm length 604. Similarly, the position of the wrist 614 can be further constrained by the elbow position 612, and the forearm length 608.

Returning to FIG. 5, virtual boundary engine 352, 452 determines if any of the one or more predicted motion paths come with a threshold distance of the virtual boundary or cross the virtual boundary (512). If none of the one or more predicted motion paths come with the threshold distance of the virtual boundary or cross the virtual boundary ("NO" branch of 512), the rendering engine can proceed to render artificial reality content without a virtual boundary warning. If at least one of the one or more predicted motion paths comes within the threshold distance of the virtual boundary or cross the virtual boundary ("YES" branch of 512), the virtual boundary engine can provide a virtual boundary warning (514). In some aspects, the virtual boundary warning can comprise warning content. In some aspects, the warning content may be a grid or other indicator that is displayed over the artificial reality content generated by application engine 340, 420. In some aspects, the warning content may be conspicuous text or image that is displayed over the artificial reality content.

FIGS. 7A-7E illustrate example body motions used to illustrate techniques of the disclosure.

Figure 7A:
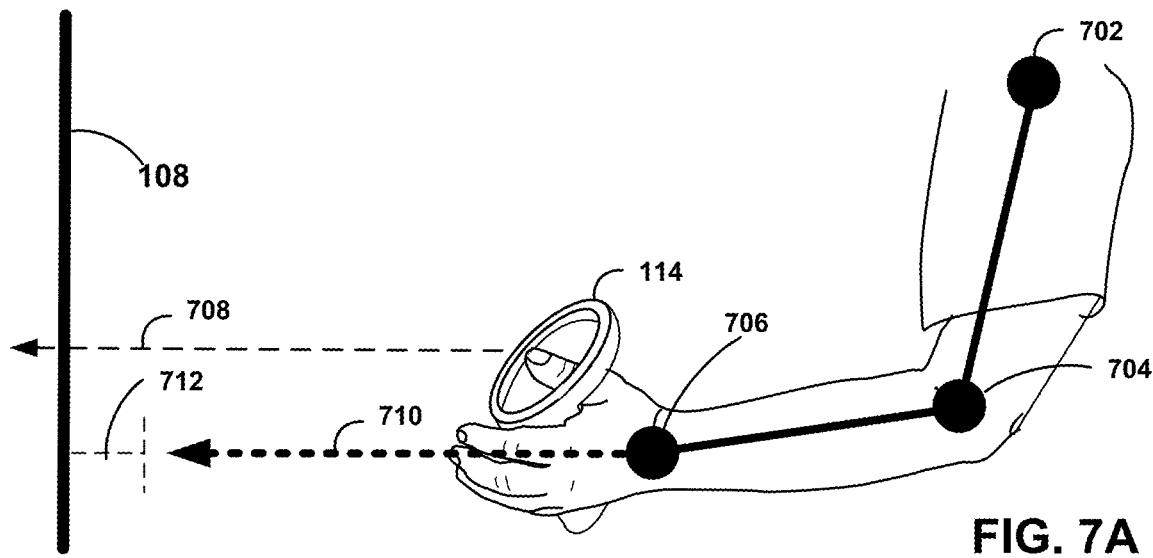
FIGS. 7A-7E illustrate example body motions used to illustrate techniques of the disclosure.
Figure 7B:
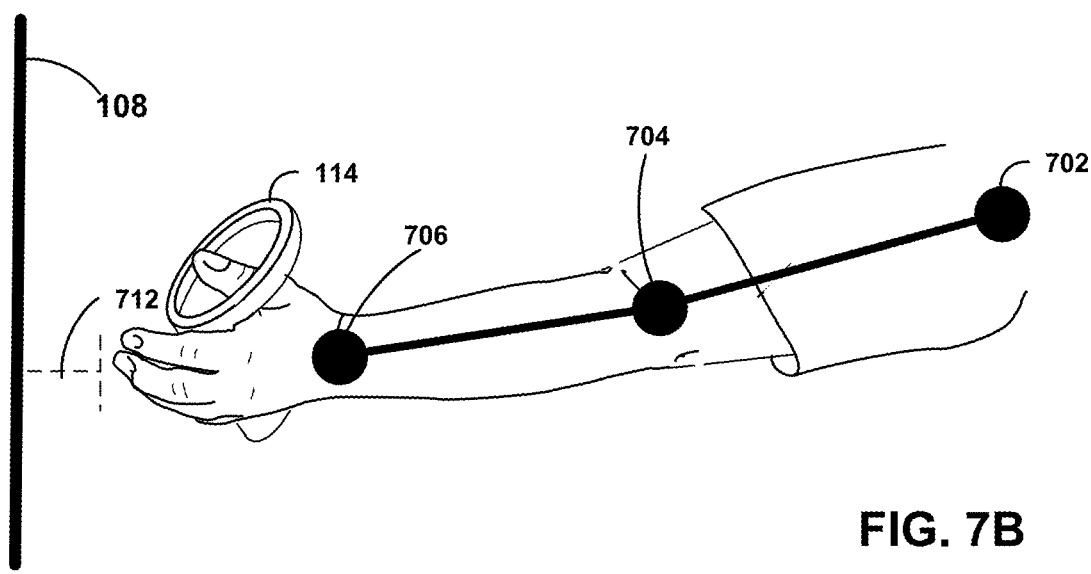

FIG. 7A illustrates an example body motion comprising extending the arm. FIG. 7A illustrates a horizontal extension of the user's arm. Based on the velocity and direction of the hand-held device 114, a conventional system may determine that a path 708 of the arm will cross the virtual boundary 706. Using the techniques described herein, an artificial reality system can determine a predicted motion path 710 based on the same velocity and direction of hand-held device 114. The predicted motion path 710 is constrained by motion constraints associate with the shoulder position 702, elbow position 704 and wrist position 706. For example, the shoulder position 702 and the arm length constrain the motion path to stopping prior to crossing a threshold distance 712 of the virtual boundary 108. FIG. 7B illustrates the user's arm as fully extended and confirms that the predicted motion path 710 of FIG. 7A accurately determines that the user's arm will not cross the virtual boundary 108, thereby avoiding the false positive of the path 708 that may be determined by a conventional system.

Figure 7C:
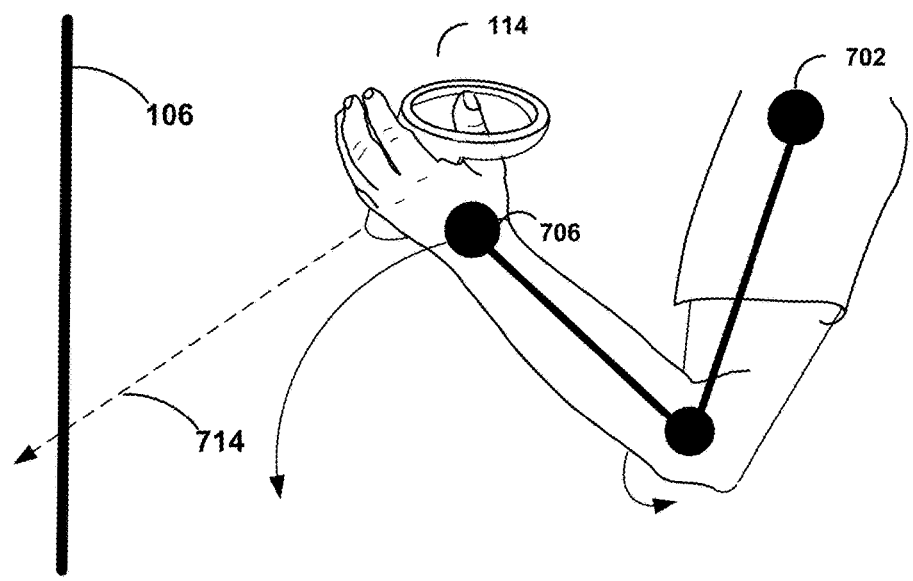
Figure 7D:
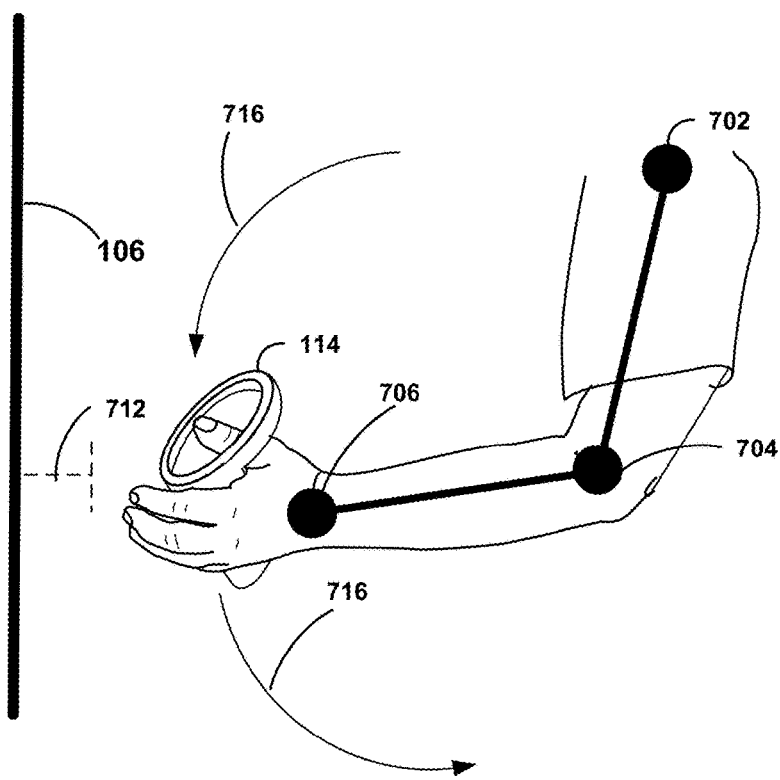

FIGS. 7C and 7D illustrate an example body motion comprising a rotation of the forearm about the Y axis at the elbow position 704. FIG. 7D illustrates a path 714 that may be determined by a conventional system. The path 714 at a time $T_0$ may be based on a vector as determined by the instantaneous velocity and direction of the hand-held controller 114. As illustrated in FIG. 7C, the path 714 crosses the virtual boundary.

FIG. 7D illustrates a path 716 as determined using the techniques described herein and based on the same instantaneous velocity and direction of the hand-held controller 114 in FIG. 7C. A path predictor 350, 450 can use motion constraints of the elbow position 704 to determine path 716. In particular, path predictor 350, 450 uses the motion constraints of the elbow position (i.e., that the elbow is constrained to rotation about the Y axis) to determine that the predicted motion path 716 is an arc. Virtual boundary engine 352, 452 can determine that the predicted motion path 716 will not come within the threshold distance 712 and will not cross the virtual boundary 706, thereby avoiding the false positive that may result in the example of FIG. 7C.

Figure 7E:
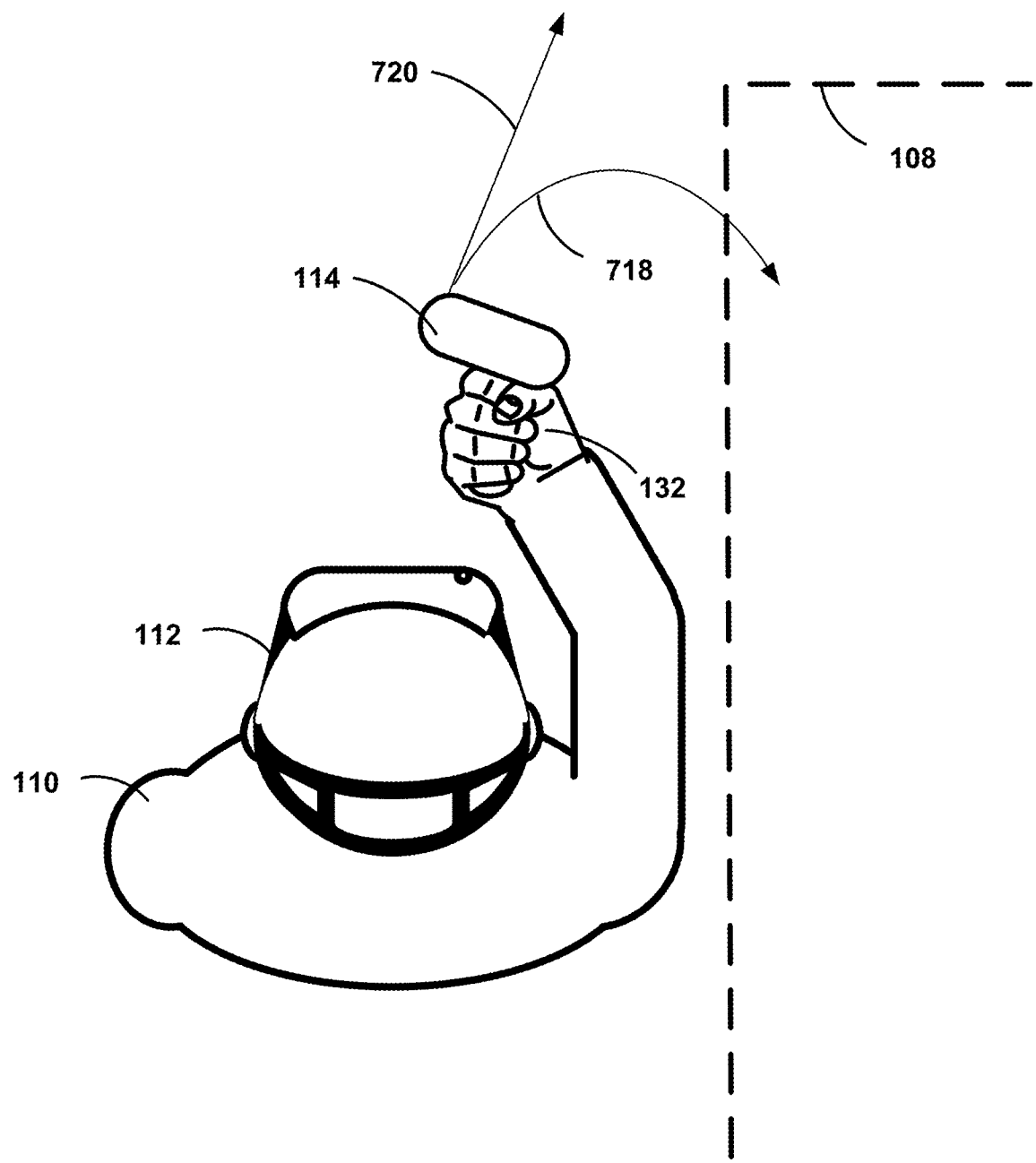

FIG. 7E is a top view illustrating a horizontal motion of the user 110's arm near a virtual boundary 108. FIGS. 7A-7D have illustrated how the techniques of various aspects of the disclosure can avoid a false positive activation of a virtual boundary 108. FIG. 7E illustrates avoiding a false negative. In the example illustrated in FIG. 7E, the user is moving their arm in a horizontal plane. Some conventional systems may fail to detect that a user or portion of the user will cross a virtual boundary. For example, as illustrated in FIG. 7E, a system that relies on a linear velocity and distance of a controller 114 to predict the path of a user's body may predict a path 720 that does not cross virtual boundary 108 in the configuration shown in FIG. 7E. This can be considered a false negative, because the system fails to predict a virtual boundary crossing when in fact, one might occur. Using the techniques described herein to predict a path, an artificial reality system can accurately determine that the motion of the user's arm will form a path 718 that will cross virtual boundary 108. The artificial reality system can generate and display warning content to the user in this situation, thereby avoiding a false negative.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
a head mounted display (HMD) configured to output artificial reality content;
a hand-held device configured to interact with the artificial reality content;
a pose tracker comprising one or more processors configured to determine an HMD pose and a hand-held device pose;
a path predictor comprising one or more processors configured to determine:
a current body position for at least a portion of a body of a user based on the HMD pose and the hand-held device pose, and
a predicted motion path based on the current body position, motion of the HMD and the hand-held device, and one or more motion constraints; and
a virtual boundary engine comprising one or more processors configured to, maintain a virtual boundary associated with a physical environment, and provide content for display by the HMD in response to a determination, that the predicted motion path comes within a threshold distance of the virtual boundary.

2. The artificial reality system of claim 1, wherein the path predictor is configured to determine body configuration parameters based on a distance of the HMD from a reference point, wherein at least one of the current body position or the motion constraints are based on the body configuration parameters.

3. The artificial reality system of claim 2, wherein the reference point comprises a floor of the physical environment.

4. The artificial reality system of claim 2, wherein the reference point comprises the hand-held device.

5. The artificial reality system of claim 2, wherein the body configuration parameters include an arm length.

6. The artificial reality system of claim 1, wherein the portion of the body comprises one or more skeletal points of the body.

7. The artificial reality system of claim 1, wherein the motion constraints include a first motion constraint associated with a first portion of the body, and a second motion constraint associate with a second portion of the body, wherein the first motion constraint is dependent on the second motion constraint.

8. The artificial reality system of claim 1, wherein:
the predicted motion path comprises a first predicted motion path associated with a first portion of the body;
the path predictor is further configured to determine a second predicted motion path associated with a second portion of the body based on the current body position, motion of the HMD and the hand-held device, and the one or more motion constraints; and
the virtual boundary engine is configured to generate the content in response to a determination that the second predicted motion path comes within the threshold distance of the virtual boundary.

9. The artificial reality system of claim 1, wherein the determination, that the predicted motion path comes within the threshold distance of the virtual boundary comprises determining that the predicted motion path crosses the virtual boundary.

10. The artificial reality system of claim 1, further comprising a rendering engine comprising one or more processors configured to render the artificial reality content with the content in response to the determination, that the predicted motion path comes within the threshold distance of the virtual boundary.

11. A method comprising:
maintaining, by an artificial reality system, a virtual boundary associated with a physical environment, the artificial reality system including a head mounted display (HMD) configured to output artificial reality content;
determining an HMD pose representing a position and orientation of the HMD;
determining a hand-held device pose representing a position and orientation of a hand-held device configured to interact with the artificial reality content;
determining a current body position for at least a portion of a body of a user based on the HMD pose and the hand-held device pose;
determining a predicted motion path based on the current body position, motion of the HMD and the hand-held device, and one or more motion constraints; and
providing content for display by the HMD in response to determining that the predicted motion path comes within a threshold distance of the virtual boundary.

12. The method of claim 11, further comprising determining one or more body configuration parameters for the body of the user based on a distance of the HMD from a reference point, wherein at least one of the current body position or the motion constraints are based on the one or more body configuration parameters.

13. The method of claim 12, wherein determining the one or more body configuration parameters based on the distance of the HMD from the reference point comprises determining the one or more body configuration parameters based on the distance of the HMD from a floor of the physical environment.

14. The method of claim 12, wherein determining the one or more body configuration parameters based on the distance of the HMD from the reference point comprises determining the one or more body configuration parameters based on the distance of the HMD from the hand-held device.

15. The method of claim 12, wherein the one or more body configuration parameters include an arm length.

16. The method of claim 11, wherein the portion of the body comprises one or more skeletal points of the body.

17. The method of claim 11, wherein the motion constraints include a first motion constraint associated with a first portion of the body, and a second motion constraint associated with a second portion of the body, wherein the first motion constraint is dependent on the second motion constraint.

18. The method of claim 11, wherein the predicted motion path comprises a first predicted motion path associated with a first portion of the body and wherein the method further comprises:
determining a second predicted motion path associated with a second portion of the body based on the current body position, motion of the HMD and the hand-held device, and the one or more motion constraints; and
generating the content in response to a determination that the second predicted motion path comes within the threshold distance of the virtual boundary.

19. The method of claim 11, wherein determining that the predicted motion path comes within the threshold distance of the virtual boundary comprises determining that the predicted motion path crosses the virtual boundary.

20. A non-transitory, computer-readable medium comprising instructions that, when executed, cause one or more processors of an artificial reality system including a head mounted display (HMD) to:

maintain a virtual boundary associated with a physical environment;

determine an HMD pose representing a position and orientation of the HMD;

determine a hand-held device pose representing a position and orientation of a hand-held device configured to interact with the artificial reality content;

determine a current body position for at least a portion of a body of a user based on the HMD pose and the hand-held device pose;

determine a predicted motion path based on the current body position, motion of the HMD and the hand-held device, and one or more motion constraints; and provide content for display by the HMD in response to determining that the predicted motion path comes within a threshold distance of the virtual boundary.

\* \* \* \* \*